United States Patent
Kogure et al.

(10) Patent No.: US 12,420,725 B2
(45) Date of Patent: Sep. 23, 2025

(54) WIRING HARNESS ROUTING STRUCTURE, LINK TYPE SLIDING DOOR, AND WIRING HARNESS

(71) Applicants: YAZAKI CORPORATION, Tokyo (JP); AISIN CORPORATION, Aichi (JP)

(72) Inventors: Naoto Kogure, Shizuoka (JP); Hikaru Sano, Shizuoka (JP); Seiichi Sumiya, Aichi (JP)

(73) Assignees: YAZAKI CORPORATION, Tokyo (JP); AISIN CORPORATION, Aichi (JP)

( * ) Notice: Subject to any disclaimer, the term of this patent is extended or adjusted under 35 U.S.C. 154(b) by 212 days.

(21) Appl. No.: 18/172,816

(22) Filed: Feb. 22, 2023

(65) Prior Publication Data
US 2023/0271571 A1   Aug. 31, 2023

(30) Foreign Application Priority Data
Feb. 28, 2022   (JP) .................. 2022-028838

(51) Int. Cl.
*B60R 16/02*   (2006.01)
*E05D 15/06*   (2006.01)

(52) U.S. Cl.
CPC ...... *B60R 16/0215* (2013.01); *E05D 15/0621* (2013.01); *E05Y 2400/654* (2013.01); *E05Y 2900/531* (2013.01)

(58) Field of Classification Search
CPC ....... B60R 6/027; B60R 6/0215; H02G 11/00; H02G 11/006
See application file for complete search history.

(56) References Cited

U.S. PATENT DOCUMENTS

| | | | | |
|---|---|---|---|---|
| 4,653,799 A | * | 3/1987 | Arai | B60J 5/047 49/248 |
| 5,879,047 A | * | 3/1999 | Yamaguchi | B60R 16/0215 296/146.7 |
| 5,921,782 A | * | 7/1999 | Yamaguchi | H02G 11/00 174/72 A |
| 6,350,956 B1 | * | 2/2002 | Sakata | B60R 16/0215 174/101 |

(Continued)

FOREIGN PATENT DOCUMENTS

| | | |
|---|---|---|
| DE | 10 2006 045 647 A1 | 6/2007 |
| DE | 10 2006 061 639 A1 | 7/2007 |

(Continued)

*Primary Examiner* — Paresh Paghadal
(74) *Attorney, Agent, or Firm* — Sughrue Mion, PLLC (57) ABSTRACT

A wiring harness routing structure includes at least a sub-link arm and a routed line. The sub-link arm includes one end that is rotatably coupled to a vehicle body by using a first coupler, and another end that is rotatably coupled to a door body by using a second coupler, and slidably supports the door body relative to the vehicle body, while rotationally moving relative to each of the vehicle body and the door body. A routed line is routed and provided along the sub-link arm, and connects a vehicle-body-side connector and a door-side connector. In addition, the routed line is routed through a lower side in a height direction of the first coupler that is coupled to the sub-link arm, in a state where the door body has slid to be fully opened.

13 Claims, 5 Drawing Sheets

(56) References Cited

U.S. PATENT DOCUMENTS

| | | | |
|---|---|---|---|
| 11,738,626 B2* | 8/2023 | Sumiya | E05D 15/101 296/146.12 |
| 2006/0254797 A1* | 11/2006 | Charara | H02G 11/00 174/72 A |
| 2007/0119610 A1* | 5/2007 | Kisu | H02G 11/006 174/72 A |
| 2007/0148992 A1* | 6/2007 | Sato | B60R 16/0207 439/34 |
| 2007/0148994 A1 | 6/2007 | Sato et al. | |
| 2007/0278820 A1* | 12/2007 | Habering | B60R 16/0215 296/146.9 |
| 2016/0264075 A1* | 9/2016 | Kogure | H02G 3/0462 |
| 2018/0370388 A1* | 12/2018 | Nakamura | B60R 16/03 |
| 2019/0232897 A1 | 8/2019 | Tomosada et al. | |

FOREIGN PATENT DOCUMENTS

| | | |
|---|---|---|
| DE | 10 2006 061 641 A1 | 7/2007 |
| JP | 2001-151042 A | 6/2001 |
| JP | 2006-90097 A | 4/2006 |
| JP | 2007-176233 A | 7/2007 |
| JP | 2008-5589 A | 1/2008 |
| JP | 2019-134626 A | 8/2019 |

\* cited by examiner

WIRING HARNESS ROUTING STRUCTURE, LINK TYPE SLIDING DOOR, AND WIRING HARNESS

CROSS-REFERENCE TO RELATED APPLICATION(S)

The present application claims priority to and incorporates by reference the entire contents of Japanese Patent Application No. 2022-028838 filed in Japan on Feb. 28, 2022.

BACKGROUND OF THE INVENTION

1. Field of the Invention

The present invention relates to a wiring harness routing structure, a link type sliding door, and a wiring harness.

2. Description of the Related Art

Conventionally, for example, Japanese Patent Application Laid-open No. 2019-134626 describes a routing structure for a sliding door. This routing structure for the sliding door includes a sliding door that includes a sliding unit that is guided by a guiding unit provided on a vehicle body side, a flexible conductor that electrically connects the sliding door to the vehicle body side, and crosses a trajectory space that the sliding unit passes through, and a plate-shaped elastic body that is disposed along the conductor.

Meanwhile, in a case where, as a configuration of the sliding door, a link type sliding door that does not include the sliding unit, but includes a link arm that slidably supports the sliding door relative to a vehicle body is configured, for example, it is requested that a routed line be routed between the vehicle body and the sliding door. In this case, it is desired that the routed line does not hinder getting-in or out when an occupant opens the sliding door, and gets in or out.

SUMMARY OF THE INVENTION

Accordingly, the present invention has been made in view of the above, and it is an object of the present invention to provide a wiring harness routing structure, a link type sliding door, and a wiring harness that enable a routed line to be properly routed.

In order to solve the above mentioned problem and achieve the object, a wiring harness routing structure according to one aspect of the present invention includes a link arm that includes one end that is rotatably coupled to a vehicle body by using a vehicle-body-side coupler, and another end that is rotatably coupled to a door body by using a door-side coupler, the link arm slidably supporting the door body relative to the vehicle body, while rotationally moving relative to each of the vehicle body and the door body; and a routed line that is routed and provided along the link arm, and connects a connection target on a side of the vehicle body and a connection target on a side of the door body, wherein the routed line is routed through a lower side in a vertical direction of the vehicle-body-side coupler, in a state where the door body has slid to be fully opened.

In order to achieve the object, a link type sliding door according to another aspect of the present invention includes a door body that is mounted on a vehicle body; a link arm that includes one end that is rotatably coupled to the vehicle body by using a vehicle-body-side coupler, and another end that is rotatably coupled to the door body by using a door-side coupler, the link arm slidably supporting the door body relative to the vehicle body, while rotationally moving relative to each of the vehicle body and the door body; and a routed line that is routed and provided along the link arm, and connects a connection target on a side of the vehicle body and the connection target on a side of the door body, wherein the routed line is routed through a lower side in a vertical direction of the vehicle-body-side coupler, in a state where the door body has slid to be fully opened.

In order to achieve the object, a wiring harness according to still another aspect of the present invention includes a routed line that is routed and provided along a link arm, and connects a connection target on a side of a vehicle body and the connection target on a side of a door body, the link arm including one end that is rotatably coupled to the vehicle body by using a vehicle-body-side coupler, and another end that is rotatably coupled to the door body by using a door-side coupler, the link arm slidably supporting the door body relative to the vehicle body, while rotationally moving relative to each of the vehicle body and the door body, wherein the routed line is routed through a lower side in a vertical direction of the vehicle-body-side coupler, in a state where the door body has slid to be fully opened.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment (an embodiment) of the present invention is described in detail with reference to the drawings. The content described in the embodiment described below is not restrictive of the present invention. Furthermore, the components described below include components that those skilled in the art could easily conceive of, or substantially the same components. Moreover, the configurations described below can be appropriately combined. Furthermore, various omissions, replacements, or modifications can be made to the configurations without departing from the spirit of the present invention.

Embodiment

A wiring harness routing structure 1, a link type sliding door SD, and a wiring harness WH according to the embodiment are described with reference to the drawings.

Note that in the description below, from among a first direction, a second direction, and a third direction that cross each other, the first direction is referred to as an "extending direction X", the second direction is referred to as a "width direction Y", and the third direction is referred to as a "height direction Z (crossing direction Z)". The extending direction X, the width direction Y, and the height direction Z cross each other, and are typically orthogonal to each other. The extending direction X is, for example, a direction along a direction (a longer-side direction) in which a main link arm 11 described later extends. The width direction Y is, for example, a direction along a shorter-side direction of the main link arm 11. The height direction Z is a direction along a vehicle height direction (a car height direction) of a vehicle, and is also a direction along a vertical direction. A sliding direction S of a door body D is a direction along the extending direction X of the main link arm 11 in a state where the door body D is closed, and here, the sliding direction S corresponds to a direction along a direction of a total length of a vehicle body B. In other words, the sliding direction S of the door body D is a direction that crosses a rotational movement axis (a rotational movement shafts 121 and 131 described later) of the main link arm 11, and is typically a direction that is orthogonal to the rotational movement axis. Respective directions to be used in the description below indicate directions in a state where respective units have been mounted on each other, unless otherwise specified.

The wiring harness routing structure 1 is applied to a vehicle, slidably supports the door body D relative to the vehicle body B of the vehicle, and electrically connects a connection target, such as a device or a connector, that is provided on a side of the vehicle body B to a connection target, such as a device or a connector, that is provided on a side of the door body D. In this example, on the side of the vehicle body B, a vehicle-body-side connector BC serving as the connection target on the side of the vehicle body B is provided. On the side of the door body D, a door-side connector DC serving as the connection target on a door side is provided. The vehicle-body-side connector BC is provided closer to the sub-link mechanism 20 described later than the main link mechanism 10 described later, and in this example, the vehicle-body-side connector BC is provided on a lower side in the height direction Z of the sub-link mechanism 20. In other words, the vehicle-body-side connector BC is provided on a side opposite to a side closer to the main link mechanism 10 of the sub-link mechanism 20. The door-side connector DC is provided between the main link mechanism 10 and the sub-link mechanism 20 (in this example, in a roughly intermediate position between the main link mechanism 10 and the sub-link mechanism 20 in the height direction Z).

Here, the vehicle body B includes a vehicle body frame Bb, a first projecting support Bb1, and a second projecting support Bb2 in addition to the vehicle-body-side connector BC described above. The vehicle body frame Bb forms a framework of the vehicle body B, and supports, for example, an engine, a transmission, suspension, wheels, or the like. The first projecting support Bb1 is provided on the vehicle body frame Bb that is located near a doorway Ba that is opened or closed by using the door body D, and is formed to project from the vehicle body frame Bb to a vehicle cabin side. The first projecting support Bb1 is formed in a frame shape, for example, by bending a metal flat plate, and internally holds a first coupler 12 of the main link mechanism 10 described later to support the first coupler 12. Furthermore, the second projecting support Bb2 is provided to be aligned with the first projecting support Bb1 along the height direction Z, is located on a lower side in the height direction Z of the first projecting support Bb1, and is formed to project from the vehicle body frame Bb to the vehicle cabin side. The second projecting support Bb2 is formed in a frame shape, for example, by bending a metal flat plate, and internally holds a first coupler 22 of the sub-link mechanism 20 described later to support the first coupler 22. On a lower side in the height direction Z of the second projecting support Bb2, the vehicle-body-side connector BC is provided.

The wiring harness routing structure 1 includes the main link mechanism 10, the sub-link mechanism 20, and a routed line W, as illustrated in FIGS. 1 to 4. The routed line W configures the wiring harness WH. In other words, it can also be said that the wiring harness WH includes the routed line W. Furthermore, the door body D, the main link mechanism 10, the sub-link mechanism 20, and the routed line W configure the link type sliding door SD. In other words, it can also be said that the link type sliding door SD includes the door body D, the main link mechanism 10, the sub-link mechanism 20, and the routed line W.

Here, the wiring harness routing structure 1 supports the door body D by using the main link mechanism 10 and the sub-link mechanism 20, and rotationally moves the main link arm 11 and a sub-link arm 21 that are described later to slide the door body D relative to the vehicle body B along the sliding direction S, without using a general guiding rail for sliding. The door body D is mounted on the vehicle body B, for example, as a door for a rear seat, and slides along the sliding direction S from a fully closed position to a fully open position relative to the vehicle body B to open the doorway Ba through which an occupant gets in or out of the vehicle. On the other hand, the door body D slides along the sliding direction S from the fully open position to the fully closed position relative to vehicle body B to close the doorway Ba. The wiring harness routing structure 1 is described in detail below.

Figure 1:
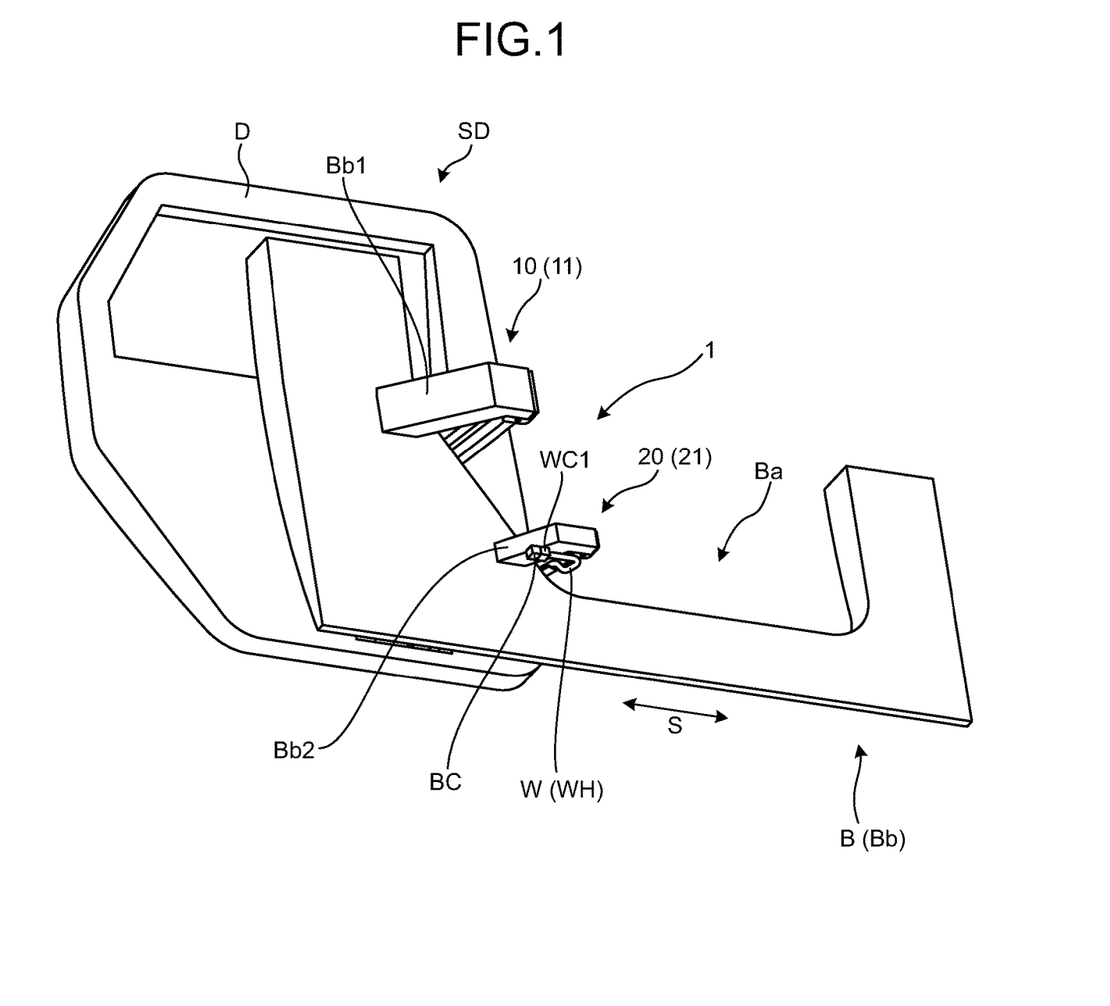
FIG. 1 is a perspective view illustrating a configuration example of a wiring harness routing structure according to an embodiment.
Figure 2:
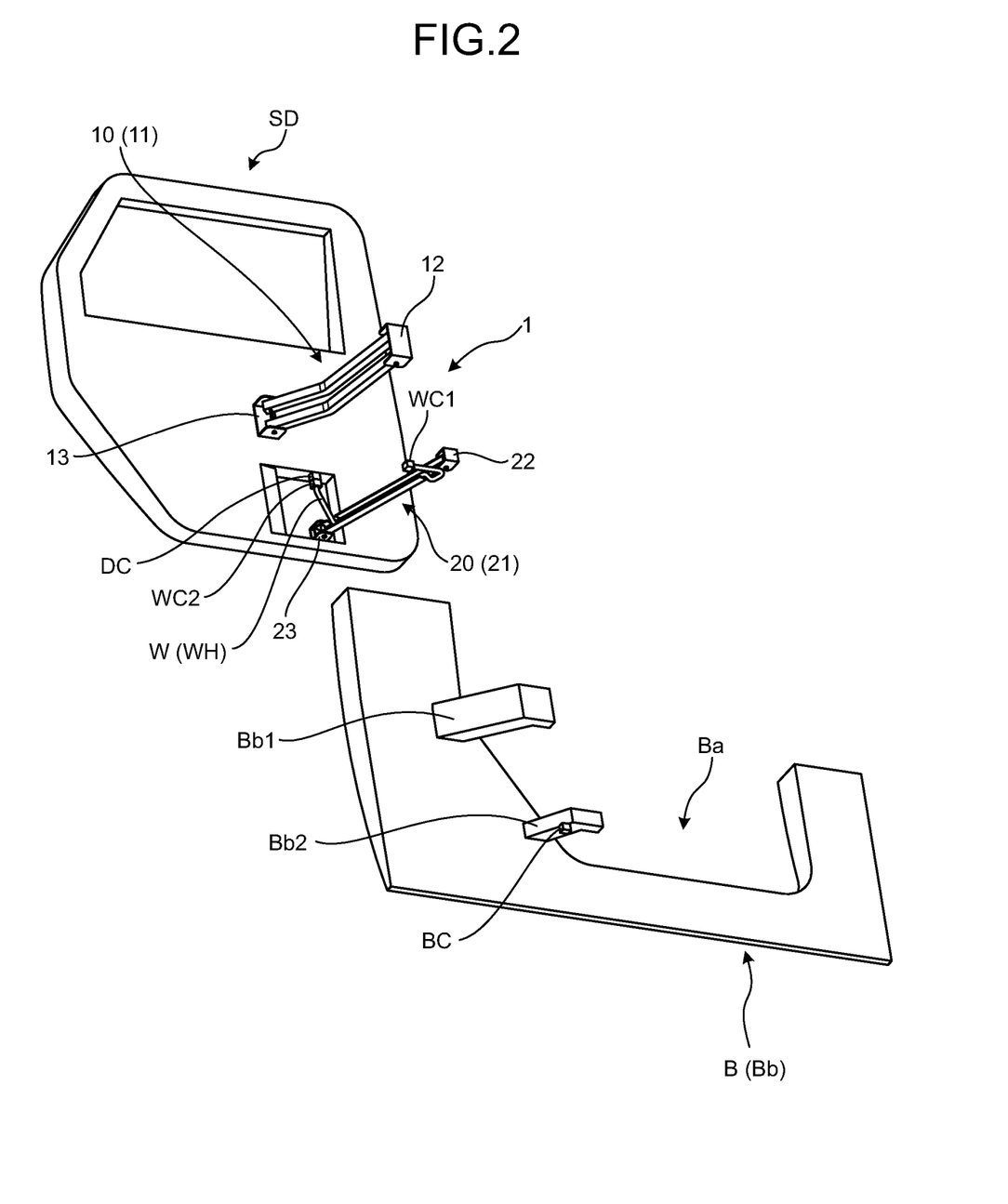
FIG. 2 is an exploded perspective view illustrating a configuration example of the wiring harness routing structure according to the embodiment.

The main link mechanism 10 is a mechanism that slidably supports the door body D relative to the vehicle body B, together with the sub-link mechanism 20, as illustrated in FIGS. 1 and 2. The main link mechanism 10 includes the main link arm 11, the first coupler 12, and a second coupler 13.

Figure 3:
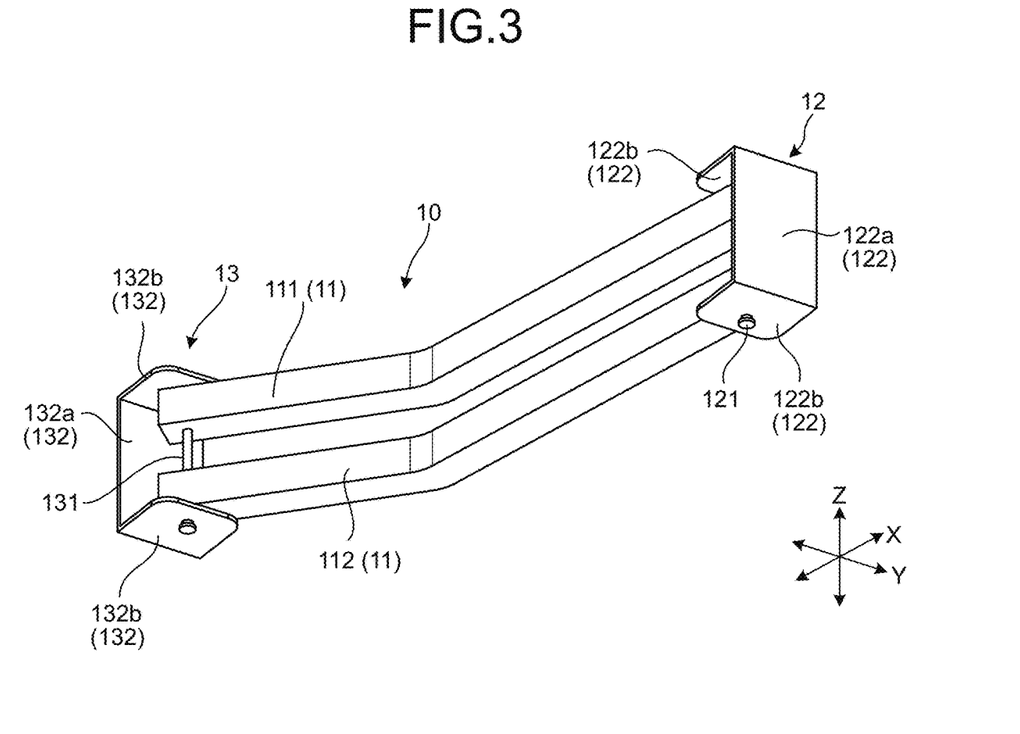
FIG. 3 is a perspective view illustrating a configuration example of a main link mechanism according to the embodiment.

The main link arm 11 is a member that slidably supports the door body D relative to the vehicle body B. The main link arm 11 includes a first arm 111 and a second arm 112, as illustrated in FIG. 3.

The first arm 111 is a metal member that extends along the extending direction X, and is formed in an elongated shape. The first arm 111 is formed, for example, in a shape including a bent portion that is bent from a side of the vehicle body B to a side of the door body D. Note that the first arm 111 is not limited to such a bent shape if the door body D can be slidably supported relative to the vehicle body B. The first arm 111 is formed in a pole shape, and is formed in a square pole shape in this example. The first arm 111 is formed in the pole shape, and therefore the first arm 111 can firmly support the door body D in comparison with, for example, a case where the first arm 111 is formed in a tube shape.

The second arm 112 is configured similarly to the first arm 111 described above. Stated another way, the second arm 112 is a metal member that extends along the extending direction X, and is formed in an elongated shape. The second arm 112 is formed, for example, in a shape including a bent portion that is bent from a side of the vehicle body B to a side of the door body D. Note that the second arm 112 is not limited to such a bent shape if the door body D can be slidably supported relative to the vehicle body B. The second arm 112 is disposed to be aligned with the first arm 111 along the height direction Z. The second arm 112 is formed in a pole shape, and is formed in a square pole shape in this example. The second arm 112 is formed in the pole shape, and therefore the second arm 112 can firmly support the door body D in comparison with, for example, a case where the second arm 112 is formed in a tube shape.

Next, the first coupler 12 is described. As illustrated in FIG. 2, the first coupler 12 rotatably couples one end in the extending direction X of the main link arm 11 to the first projecting support Bb1 of the vehicle body B, and includes the rotational movement shaft 121 and a bearing 122.

The rotational movement shaft 121 rotatably supports the one end in the extending direction X of the main link arm 11. The rotational movement shaft 121 is formed in a bar shape, extends along the height direction Z, and is inserted into a hole (a hole having a tube shape) at the one end in the extending direction X of the main link arm 11. Specifically, the rotational movement shaft 121 is inserted into a hole at one end in the extending direction X of the first arm 111, and a hole at one end in the extending direction X of the second arm 112 in the main link arm 11. The rotational movement shaft 121 is provided with a stopper (not illustrated) that keeps a spacing between the first arm 111 and the second arm 112 constant in the height direction Z. This stopper prevents the first arm 111 and the second arm 112 from being misaligned in the height direction Z. The rotational movement shaft 121 that extends along the height direction Z supports the one end of the first arm 111 and the one end of the second arm 112 in a rotatable manner around an axis of the rotational movement shaft 121. Note that a configuration that prevents the first arm 111 and the second arm 112 from being misaligned may be a configuration other than the stopper described above.

The bearing 122 couples the rotational movement shaft 121 to the vehicle body B. The bearing 122 includes a fixed plate 122a and a pair of support plates 122b.

The fixed plate 122a is a portion that is fixed to the first projecting support Bb1 of the vehicle body B. The fixed plate 122a is formed in a flat plate shape, extends along the height direction Z, and is fixed to an inside of the first projecting support Bb1 of the vehicle body B that is formed in a frame shape.

The pair of support plates 122b support the rotational movement shaft 121. The pair of support plates 122b are each formed in a flat plate shape, are provided in a standing manner along the width direction Y from both ends in the height direction Z of the fixed plate 122a, and are spaced apart from each other by a fixed spacing along the height direction Z. The pair of support plates 122b are provided with the rotational movement shaft 121 between one support plate 122b and another support plate 122b. The pair of support plates 122b each include a hole that the rotational movement shaft 121 is inserted into, one end of the rotational movement shaft 121 is inserted into the hole of one support plate 122b, and another end of the rotational movement shaft 121 is inserted into the hole of another support plate 122b. The rotational movement shaft 121 that has been inserted into the pair of support plates 122b is provided with a slip-off prevention portion in both end portions of the rotational movement shaft 121. In the bearing 122 configured as described above, the fixed plate 122a is fixed to the first projecting support Bb1 of the vehicle body B in a state where both ends of the rotational movement shaft 121 that has been inserted into the first arm 111 and the second arm 112 are supported by the pair of support plates 122b.

Next, the second coupler 13 is described. As illustrated in FIG. 3, the second coupler 13 rotatably couples another end in the extending direction X of the main link arm 11 to the door body D, and is configured similarly to the first coupler 12. Stated another way, the second coupler 13 includes a rotational movement shaft 131 and a bearing 132.

The rotational movement shaft 131 rotatably supports the other end in the extending direction X of the main link arm 11. The rotational movement shaft 131 is formed in a bar shape, extends along the height direction Z, and is inserted into a hole (a hole having a tube shape) at the other end in the extending direction X of the main link arm 11. Specifically, the rotational movement shaft 131 is inserted into a hole at another end in the extending direction X of the first arm 111, and a hole at another end in the extending direction X of the second arm 112 in the main link arm 11. The rotational movement shaft 131 is provided with a stopper (not illustrated) that keeps a spacing between the first arm 111 and the second arm 112 constant in the height direction Z. This stopper prevents the first arm 111 and the second arm 112 from being misaligned in the height direction Z. The rotational movement shaft 131 that extends along the height direction Z supports the other end of the first arm 111 and the other end of the second arm 112 in a rotatable manner around an axis of the rotational movement shaft 131. Note that a configuration that prevents the first arm 111 and the second arm 112 from being misaligned may be a configuration other than the stopper described above.

The bearing 132 couples the rotational movement shaft 131 to the door body D. The bearing 132 includes a fixed plate 132a and a pair of support plates 132b.

The fixed plate 132a is a portion that is fixed to the door body D. The fixed plate 132a is formed in a flat plate shape, extends along the height direction Z, and is fixed to the door body D.

The pair of support plates 132b support the rotational movement shaft 131. The pair of support plates 132b are each formed in a flat plate shape, are provided in a standing manner along the width direction Y from both ends in the height direction Z of the fixed plate 132a, and are spaced apart from each other by a fixed spacing along the height direction Z. The pair of support plates 132b are provided with the rotational movement shaft 131 between one support plate 132b and another support plate 132b. The pair of support plates 132b each include a hole that the rotational movement shaft 131 is inserted into, one end of the rotational movement shaft 131 is inserted into the hole of one support plate 132b, and another end of the rotational movement shaft 131 is inserted into the hole of another support plate 132b. The rotational movement shaft 131 that has been inserted into the pair of support plates 132b is provided with a slip-off prevention portion in both end portions of the rotational movement shaft 131. In the bearing 132 configured as described above, the fixed plate 132a is fixed to the door body D in a state where both ends of the rotational movement shaft 131 that has been inserted into the first arm 111 and the second arm 112 are supported by the pair of support plates 132b.

The main link arm 11 configured as described above, together with the sub-link mechanism 20, supports the door body D relative to the vehicle body B in a slidable manner along the sliding direction S, while rotationally moving relative to each of the vehicle body B and the door body D.

Next, the sub-link mechanism 20 is described. The sub-link mechanism 20 is provided to be aligned with the main link mechanism 10 along the height direction Z, is provided on a lower side in the height direction Z of the main link mechanism 10 in this example, and slidably supports the door body D relative to the vehicle body B, together with the main link mechanism 10. The sub-link mechanism 20 includes the sub-link arm 21, the first coupler 22, and a second coupler 23.

Figure 4:
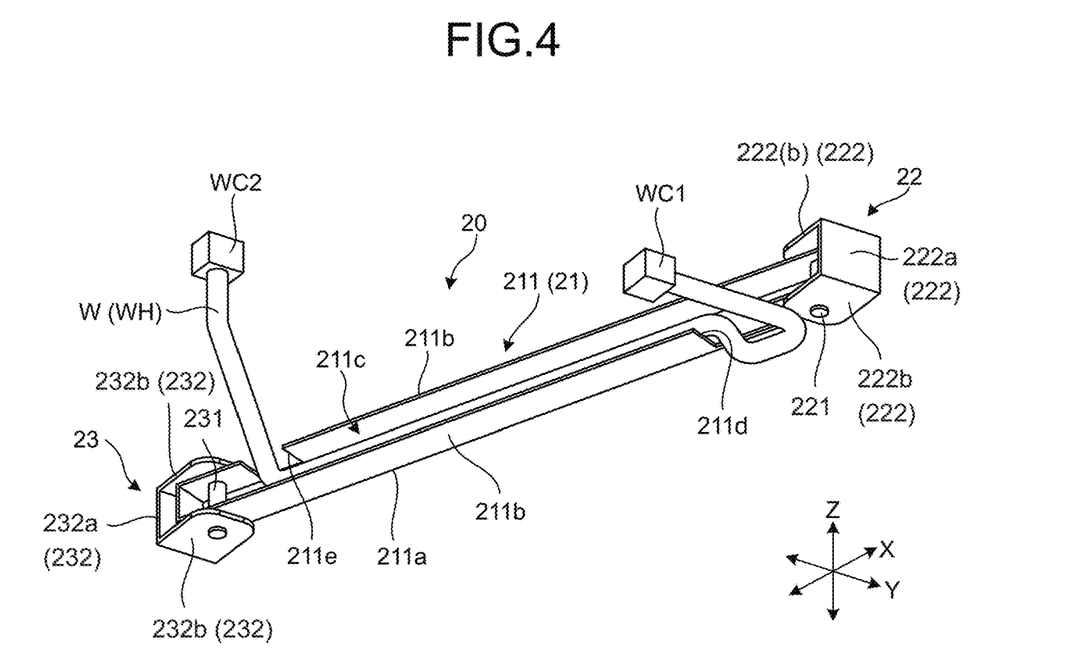
FIG. 4 is a perspective view illustrating a configuration example of a sub-link mechanism according to the embodiment.

The sub-link arm 21 is provided to be aligned with the main link arm 11 along the height direction Z, and includes a first arm 211, as illustrated in FIG. 4.

The first arm 211 is a metal member that extends along the extending direction X, and is formed in an elongated shape. The first arm 211 is formed, for example, in a linear shape along the extending direction X. Note that the first arm 211 is not limited to such a linear shape if the door body D can be slidably supported relative to the vehicle body B. The first arm 211 includes a bottom face 211a and a pair of side walls 211b. The bottom face 211a is a portion that is located on one side (a side opposite to the door body D) in the width direction Y, and is formed in an elongated shape and a flat plate shape along the extending direction X. The pair of side walls 211b are each formed in an elongated shape and a flat plate shape along the extending direction X, are provided in a standing manner along the width direction Y from both ends in the height direction Z of the bottom face 211a, and are spaced apart from each other by a fixed spacing along the height direction Z. The first arm 211 is open on another side (a side of the door body D) in the width direction Y of the bottom face 211a, and is closed in both end portions in the extending direction X. The first arm 211 houses the routed line W that is routed between a side of the vehicle body B and a side of the door body D, in a groove 211c described later that is formed to be surrounded by the bottom face 211a and the pair of side walls 211b.

Here, from among the pair of side walls 211b, the side wall 211b on one side (the side wall 211b on a side closer to the main link arm 11) includes a first cut-away portion 211d and a second cut-away portion 211e. The first cut-away portion 211d is provided on one side in the extending direction X of the side wall 211b, and is formed by cutting away part of the side wall 211b in a rectangular shape. The first cut-away portion 211d is an opening that guides a one end side of the routed line W that is housed in the groove 211c to an outside of the groove 211c.

In the routed line W that is housed in the groove 211c, one end of the routed line W extends from an inside of the groove 211c to the outside via the first cut-away portion 211d, and is connected to the vehicle-body-side connector BC. Furthermore, the second cut-away portion 211e is provided on another side in the extending direction X of the side wall 211b, and is formed by cutting away part of the side wall 211b in a rectangular shape. The second cut-away portion 211e is an opening that guides another end side of the routed line W that is housed in the groove 211c to the outside of the groove 211c. In the routed line W that is housed in the groove 211c, another end of the routed line W extends from an inside of the groove 211c to the outside via the second cut-away portion 211e, and is connected to the door-side connector DC.

Next, the first coupler 22 is described. As illustrated in FIG. 4, the first coupler 22 rotatably couples one end in the extending direction X of the sub-link arm 21 to the vehicle body B. The first coupler 22 is provided on a route through which an occupant gets in or out for the sake of a structure of the link type sliding door SD, and is located, for example, in a place that can be stepped on with a foot of the occupant when the occupant gets in or out through the doorway Ba.

Figure 5:
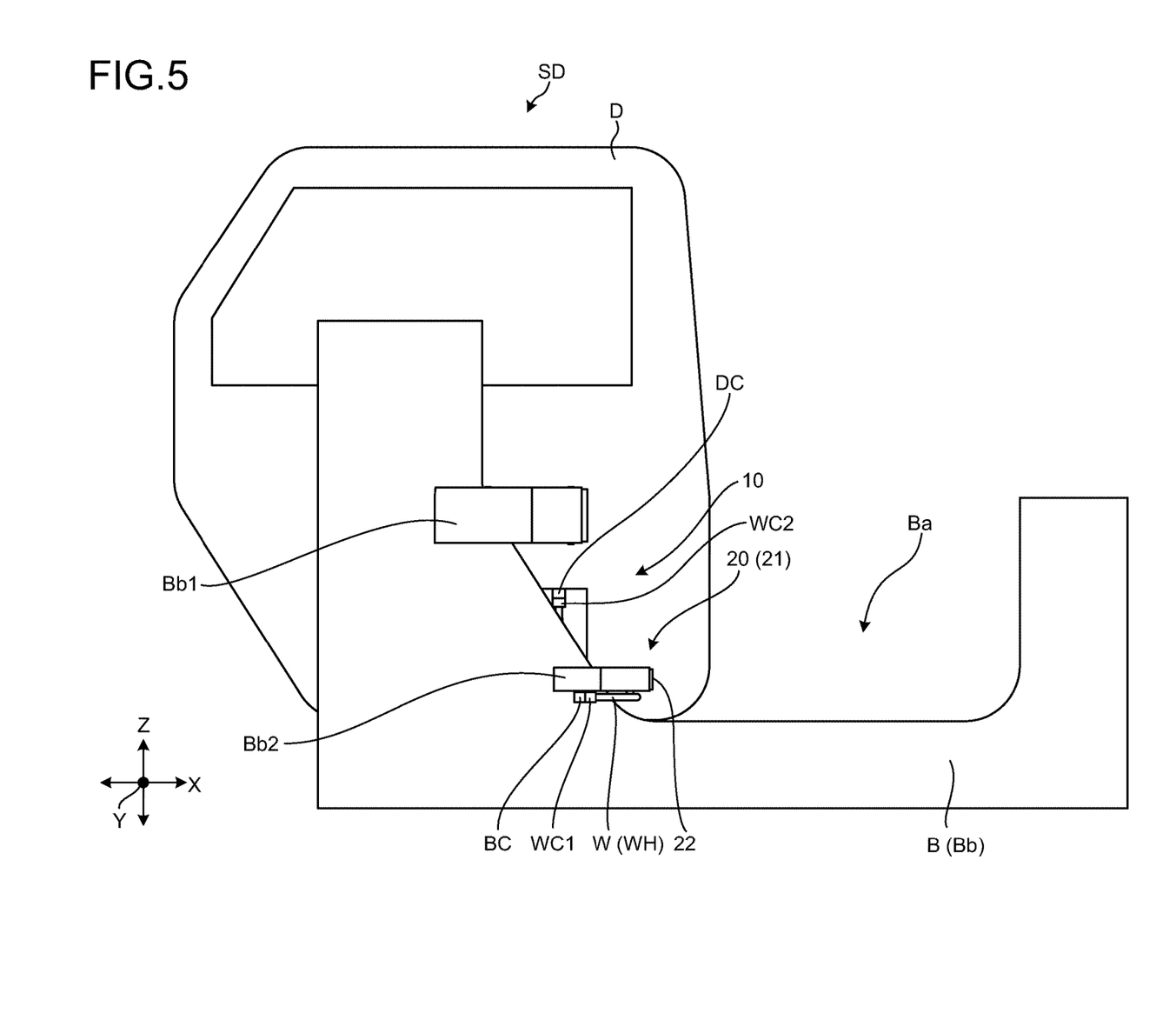
FIG. 5 is a front view illustrating a fully open state of a door body according to the embodiment.

For examples, as illustrated in FIG. 5, the first coupler 22 is provided inside the doorway Ba that is opened or closed by the door body D, in a case where the first coupler 22 is viewed from a direction (the width direction Y) in which the occupant gets in or out in a state where the door body D is fully opened. For example, the first coupler 22 is provided on a rear side in the sliding direction S of the doorway Ba (a side toward which the door body D is moved to the fully open state along the sliding direction S) and on a lower side in the height direction Z of the doorway Ba, in a case where the first coupler 22 is viewed from the direction (the width direction Y) in which the occupant gets in or out in a state where the door body D is fully opened. Moreover, the first coupler 22 overlaps the door body D that has moved to a rear position in the fully open state, in a case where the first coupler 22 is viewed from the direction (the width direction Y) in which the occupant gets in or out in a state where the door body D is fully opened. The sub-link arm 21 that is coupled to the first coupler 22 is provided over the doorway Ba, in a case where the sub-link arm 21 is viewed from the height direction Z in a state where the door body D is fully opened. As described above, the first coupler 22 is provided in a position that can be stepped on with foot when the occupant gets in or out in the doorway Ba, for the sake of a structure of the link type sliding door SD. The first coupler 22 includes a rotational movement shaft 221 and a bearing 222, as illustrated in FIG. 4.

The rotational movement shaft 221 rotatably supports the one end in the extending direction X of the sub-link arm 21. The rotational movement shaft 221 is formed in a bar shape, extends along the height direction Z, and is inserted into a hole (a hole having a tube shape) at the one end in the extending direction X of the sub-link arm 21. Specifically, the rotational movement shaft 221 is inserted into a hole at one end in the extending direction X of the first arm 211 in the sub-link arm 21. The rotational movement shaft 221 that extends along the height direction Z supports the one end of the first arm 211 in a rotatable manner around an axis of the rotational movement shaft 221.

The bearing 222 couples the rotational movement shaft 221 to the vehicle body B. The bearing 222 includes a fixed plate 222a and a pair of support plates 222b.

The fixed plate 222a is a portion that is fixed to the second projecting support Bb2 of the vehicle body B. The fixed plate 222a is formed in a flat plate shape, extends along the height direction Z, and is fixed to an inside of the second projecting support Bb2 of the vehicle body B that is formed in a frame shape.

The pair of support plates 222b support the rotational movement shaft 221. The pair of support plates 222b are each formed in a flat plate shape, are provided in a standing manner along the width direction Y from both ends in the height direction Z of the fixed plate 222a, and are spaced apart from each other by a fixed spacing along the height direction Z. The pair of support plates 222b are provided with the rotational movement shaft 221 between one support plate 222b and another support plate 222b. The pair of support plates 222b each include a hole that the rotational movement shaft 221 is inserted into, one end of the rotational movement shaft 221 is inserted into the hole of one support plate 222b, and another end of the rotational movement shaft 221 is inserted into the hole of another support plate 222b. The rotational movement shaft 221 that has been inserted into the pair of support plates 222b is provided with a slip-off prevention portion in both end portions of the rotational movement shaft 221. In the bearing 222 configured as described above, the fixed plate 222a is fixed to the second projecting support Bb2 of the vehicle body B in a state where both ends of the rotational movement shaft 221 that has been inserted into the first arm 211 are supported by the pair of support plates 222b.

Next, the second coupler 23 is described. As illustrated in FIG. 4, the second coupler 23 rotatably couples another end in the extending direction X of the sub-link arm 21 to the door body D, and is configured similarly to the first coupler 22. Stated another way, the second coupler 23 includes a rotational movement shaft 231 and a bearing 232.

The rotational movement shaft 231 rotatably supports the other end in the extending direction X of the sub-link arm 21. The rotational movement shaft 231 is formed in a bar shape, extends along the height direction Z, and is inserted into a hole (a hole having a tube shape) at the other end in the extending direction X of the sub-link arm 21. Specifically, the rotational movement shaft 231 is inserted into a hole at another end in the extending direction X of the first arm 211 in the sub-link arm 21. The rotational movement shaft 231 that extends along the height direction Z supports the other end of the first arm 211 in a rotatable manner around an axis of the rotational movement shaft 231.

The bearing 232 couples the rotational movement shaft 231 to the door body D. The bearing 232 includes a fixed plate 232a and a pair of support plates 232b.

The fixed plate 232a is a portion that is fixed to the door body D. The fixed plate 232a is formed in a flat plate shape, extends along the height direction Z, and is fixed to the door body D.

The pair of support plates 232b support the rotational movement shaft 231. The pair of support plates 232b are each formed in a flat plate shape, are provided in a standing manner along the width direction Y from both ends in the height direction Z of the fixed plate 232a, and are spaced apart from each other by a fixed spacing along the height direction Z. The pair of support plates 232b are provided with the rotational movement shaft 231 between one support plate 232b and another support plate 232b. The pair of support plates 232b each include a hole that the rotational movement shaft 231 is inserted into, one end of the rotational movement shaft 231 is inserted into the hole of one support plate 232b, and another end of the rotational movement shaft 231 is inserted into the hole of another support plate 232b. The rotational movement shaft 231 that has been inserted into the pair of support plates 232b is provided with a slip-off prevention portion in both end portions of the rotational movement shaft 231. In the bearing 232 configured as described above, the fixed plate 232a is fixed to the door body D in a state where both ends of the rotational movement shaft 231 that has been inserted into the first arm 211 are supported by the pair of support plates 232b.

The sub-link arm 21 configured as described above, together with the main link arm 11, slidably supports the door body D relative to the vehicle body B, while rotationally moving relative to each of the vehicle body B and the door body D.

The wiring harness routing structure 1 includes the groove 211c that is provided in the sub-link arm 21, as a structure that routes the routed line W in the link type sliding door SD, as described above.

The groove 211c is provided in the first arm 211 of the sub-link arm 21, and is a region that is formed to be surrounded by the bottom face 211a and the pair of side walls 211b of the first arm 211. The groove 211c is formed in a groove shape along the extending direction X in the first arm 211, and a cross section of the groove 211c is formed in a rectangular shape. The groove 211c includes a housing space that can house the routed line W, can house, in the housing space, the routed line W that is routed along the first arm 211 between a side of the vehicle body B and a side of the door body D, and houses the routed line W in the housing space.

Next, the routed line W that is routed along the sub-link arm 21 is described. The routed line W includes a power line that is used to supply power, a communication line that is used to perform communication, or the like, is provided with a connector WC1 at one end, and is provided with a connector WC2 at another end.

Figure 6:
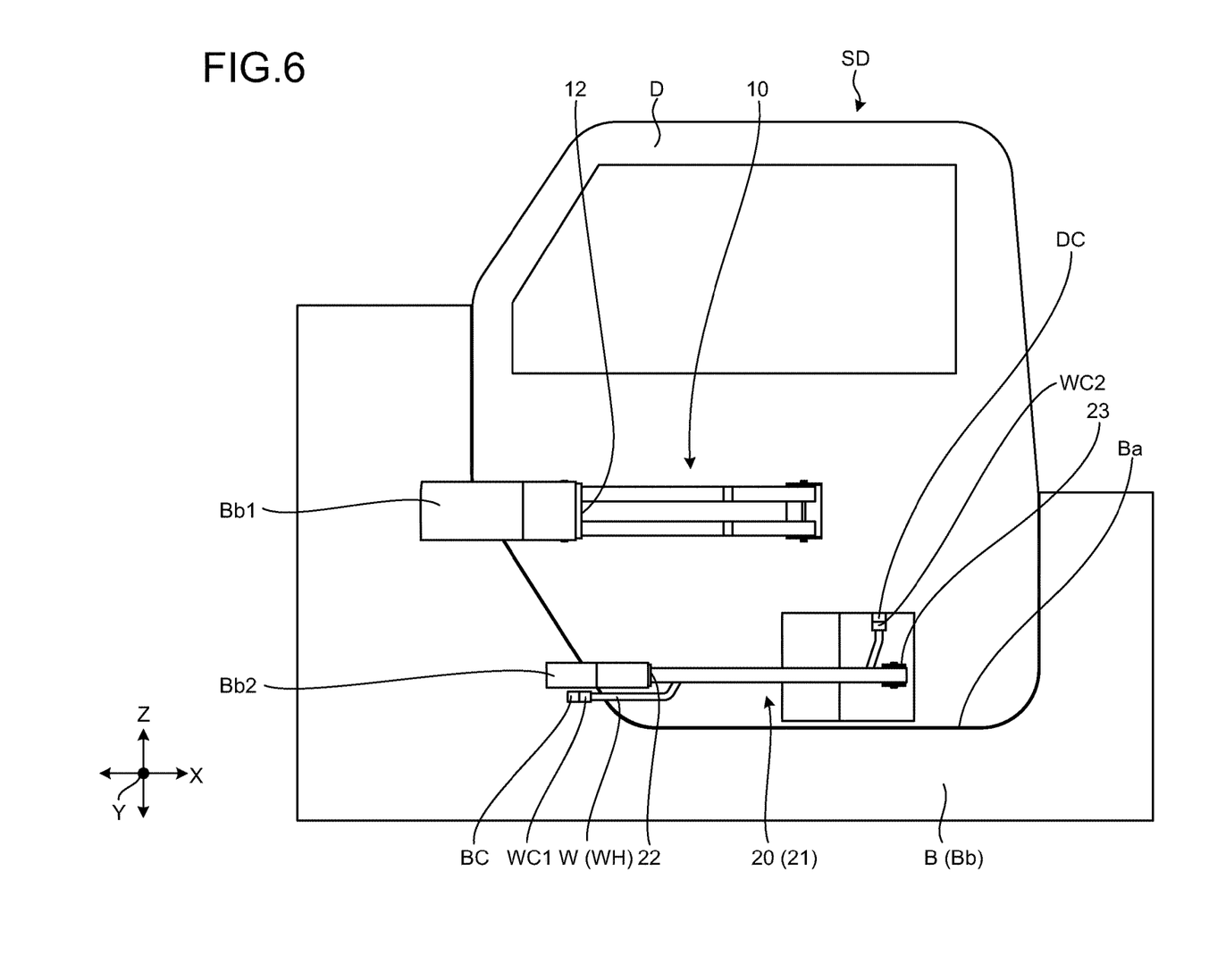
FIG. 6 is a front view illustrating a fully closed state of the door body according to the embodiment.

The routed line W is routed and provided along the sub-link arm 21, and in this example, the routed line W is routed in a state where the routed line W is housed in the groove 211c of the sub-link arm 21. In the routed line W that is housed in the groove 211c, one end of the routed line W extends from an inside of the groove 211c to an outside (a side of the vehicle-body-side connector BC) via the first cut-away portion 211d, and another end of the routed line W extends from the inside of the groove 211c to the outside (a side of the door-side connector DC) via the second cut-away portion 211e. In addition, as illustrated in FIG. 5, in a state where the door body D has slid to be fully opened, the routed line W that extends to a side of the vehicle-body-side connector BC is routed through a lower side in the height direction Z of the first coupler 22 that is coupled to one end of the sub-link arm 21, and is also routed through a lower side in the height direction Z of the second projecting support Bb2 that supports the first coupler 22. In other words, the routed line W is routed through a side opposite to a side closer to the main link arm 11 of the first coupler 22 that is coupled to the one end of the sub-link arm 21, and is also routed through a side opposite to a side closer to the main link arm 11 of the second projecting support Bb2 that supports the first coupler 22. Furthermore, the routed line W that extends to a side of the door-side connector DC is routed through an upper side in the height direction Z of the second coupler 23 that is coupled to another end of the sub-link arm 21. In other words, the routed line W that extends to a side of the door-side connector DC is routed through a side closer to the main link arm 11 of the second coupler 23 that is coupled to the other end of the sub-link arm 21. The connector WC1 of the routed line W that has been routed through the lower side in the height direction Z of the first coupler 22 and the second projecting support Bb2 is connected to the vehicle-body-side connector BC that is provided on a side of the vehicle body B. The connector WC2 of the routed line W that has been routed through the side closer to the main link arm 11 of the second coupler 23 is connected to the door-side connector DC that is provided on a side of the door body D. As described above, the routed line W is connected to the vehicle-body-side connector BC in a state where the routed line W has been routed through the lower side in the height direction Z of the first coupler 22 and the second projecting support Bb2. In addition, as illustrated in FIG. 6, in a state where the door body D has slid to be fully closed, similarly, the routed line W is routed through the lower side in the height direction Z of the first coupler 22, and is also routed through the lower side in the height direction Z of the second projecting support Bb2 that supports the first coupler 22. Furthermore, in a state where the door body D is in a semi-open state between the fully open state and the fully closed state, similarly, the routed line W is routed through the lower side in the height direction Z of the first coupler 22, and is also routed through the lower side in the height direction Z of the second projecting support Bb2 that supports the first coupler 22. Stated another way, whatever state the door body D is in between the fully open state and the fully closed state, the routed line W is routed through the lower side in the height direction Z of the first coupler 22, and is also routed through the lower side in the height direction Z of the second projecting support Bb2 that supports the first coupler 22.

In the wiring harness routing structure 1 configured as described above, the main link arm 11 is rotationally moved by a driving unit (not illustrated) that includes a motor or the like that is provided in the vehicle body B, and therefore the main link arm 11 and the sub-link arm 21 rotationally move relative to each of the vehicle body B and the door body D, and slide the door body D relative to the vehicle body B from a fully closed position to a fully open position, or from the fully open position to the fully closed position along the sliding direction S. Stated another way, the main link arm 11 is rotationally moved by the driving unit to rotationally move relative to each of the vehicle body B and the door body D by using, as a rotational movement axis, the rotational movement shaft 121 of the first coupler 12 and the rotational movement shaft 131 of the second coupler 13. At this time, the main link arm 11 is rotationally moved by the driving unit, and therefore the sub-link arm 21 rotationally moves relative to each of the vehicle body B and the door body D by using, as a rotational movement axis, the rotational movement shaft 221 of the first coupler 22 and the rotational movement shaft 231 of the second coupler 23. The routed line W that has been routed along the sub-link arm 21 and is housed in the groove 211c also electrically connects the vehicle-body-side connector BC and the door-side connector DC while the sub-link arm 21 is rotationally moving.

As described above, the wiring harness routing structure 1 according to the embodiment includes at least the sub-link arm 21 and the routed line W. The sub-link arm 21 includes one end that is rotatably coupled to the vehicle body B by using the first coupler 22, and another end that is rotatably coupled to the door body D by using the second coupler 23, and slidably supports the door body D relative to the vehicle body B, while rotationally moving relative to each of the vehicle body B and the door body D. A routed line W is routed and provided along the sub-link arm 21, and connects a vehicle-body-side connector BC and a door-side connector DC. In addition, the routed line W is routed through a lower side in the height direction Z of the first coupler 22 that is coupled to the sub-link arm 21, in a state where the door body D has slid to be fully opened.

By employing this configuration, the routed line W is routed through a lower side of the first coupler 22 of the sub-link arm 21, and therefore the wiring harness routing structure 1 can avoid a situation where when an occupant opens the door body D, and gets in or out, the routed line W hinders getting-in or out, and this enables the occupant to smoothly get in or out. Stated another way, the wiring harness routing structure 1 can avoid a situation where when the occupant opens the door body D to get in or out, the routed line W that has been routed along the sub-link arm 21 is stepped on by the occupant. As a result of this, the wiring harness routing structure 1 can avoid damage to the routed line W, and can avoid a deterioration in durability of the routed line W. As described above, the wiring harness routing structure 1 can properly route the routed line W.

In the wiring harness routing structure 1 described above, the routed line W is routed through the lower side in the height direction Z of the first coupler 22, in a state where the door body D has slid to be fully closed. By employing this configuration, the wiring harness routing structure 1 can avoid a situation where a foot of an occupant who is seated in a seat touches the routed line W in a state where the door body D is fully closed.

In the wiring harness routing structure 1 described above, the first coupler 22 that is coupled to the sub-link arm 21 is provided inside the doorway Ba that is opened or closed by the door body D, in a case where the first coupler 22 is viewed from a direction in which the occupant gets in or out in a state where the door body D is fully opened. In a case where the first coupler 22 that is coupled to the sub-link arm 21 is located on a getting-in or out route, similarly, the wiring harness routing structure 1 can avoid a situation where the routed line W that is routed along the sub-link arm 21 is stepped on by the occupant, and the occupant can smoothly get in or out through the doorway Ba.

In the wiring harness routing structure 1 described above, the vehicle body B includes the vehicle body frame Bb that forms a framework of the vehicle body B, and the second projecting support Bb2 that is provided to project from the vehicle body frame Bb to the vehicle cabin side, and supports the first coupler 22 of the sub-link arm 21. The routed line W is routed through a lower side in the height direction Z of the second projecting support Bb2. Here, in a case where the second projecting support Bb2 that supports the first coupler 22 of the sub-link arm 21 is viewed from a direction in which the occupant gets in or out in a state where the door body D is fully opened, part of the second projecting support Bb2 is provided inside the doorway Ba. In a case where part of the second projecting support Bb2 is provided inside the doorway Ba, as described above, similarly, the wiring harness routing structure 1 can avoid a situation where the routed line W that is routed along the sub-link arm 21 hinders getting-in or out.

In the wiring harness routing structure 1 described above, the sub-link arm 21 includes the groove 211c that is formed in a groove shape along the extending direction X in which the sub-link arm 21 extends, and can house the routed line W. The routed line W is routed in a state where the routed line W is housed in the groove 211c. By employing this configuration, the wiring harness routing structure 1 can secure a routing space where the routed line W is routed, between the vehicle body B and the door body D, by using the groove 211c of the sub-link arm 21. Furthermore, in the wiring harness routing structure 1, the routed line W that is routed between the vehicle body B and the door body D is housed in the groove 211c of the sub-link arm 21, and is routed. Therefore, the routed line W can be prevented from being exposed to the outside, and can be prevented from being caught in comparison with a case where the routed line W is exposed to the outside, as is conventional. Furthermore, the wiring harness routing structure 1 can hide the routed line W from the outside, and can improve appearance. As described above, the wiring harness routing structure 1 can properly route the routed line W between the vehicle body B and the door body D.

The link type sliding door SD includes at least the door body D that is mounted on the vehicle body B, the sub-link arm 21, and the routed line W, and the routed line W is routed through a lower side in the height direction Z of the first coupler 22 that is coupled to the sub-link arm 21, in a state where the door body D has slid to be fully opened. By employing this configuration, the link type sliding door SD can achieve a sliding door that has avoided a situation where the routed line W hinders getting-in or out when the occupant opens the door body D, and gets in or out.

The wiring harness WH includes the routed line W that connects the vehicle-body-side connector BC and the door-side connector DC, and the routed line W is routed through a lower side in the height direction Z of the first coupler 22 that is coupled to the sub-link arm 21, in a state where the door body D has slid to be fully opened. By employing this configuration, the wiring harness WH can avoid a situation where the routed line W hinders getting-in or out when the occupant opens the door body D, and gets in or out, and therefore the routed line W can be properly routed.

Variations

An example where the routed line W is routed through a lower side in the height direction Z of the second projecting support Bb2 of the vehicle body B has been described, but this is not restrictive. For example, the routed line W may be routed through an upper side in the height direction Z of the second projecting support Bb2.

An example where the wiring harness routing structure 1 and the link type sliding door SD include two link mechanisms, the main link mechanism 10 and the sub-link mechanism 20 has been described, but this is not restrictive. A single link mechanism (for example, a configuration that does not include the main link mechanism 10, but includes the sub-link mechanism 20) may be employed.

An example where the door body D is mounted on the vehicle body B as a door for a rear seat has been described, but this is not restrictive. For example, the door body D may be mounted on the vehicle body B as another door such as a door for a driver seat or a passenger seat.

An example where in the wiring harness routing structure 1, the main link arm 11 is rotationally moved by the driving unit so that the main link arm 11 and the sub-link arm 21 rotationally move relative to each of the vehicle body B and the door body D has been described, but this is not restrictive. For example, the driving unit may be omitted, and the main link arm 11 and the sub-link arm 21 may rotationally move relative to each of the vehicle body B and the door body D according to an operation performed by an occupant of a vehicle to slide the door body D.

An example where the groove 211c is formed to have a rectangular cross section has been described, but this is not restrictive. For example, the cross section may be formed in a U-shape in which a bottom face is curved, a C-shape, an H-shape, or the like.

An example where in the groove 211c, the bottom face 211a is located on one side (a side opposite to the door body D) in the width direction Y, and another side (a side of the door body D) in the width direction Y of the bottom face 211a is open has been described, but this is not restrictive. For example, the bottom face 211a may be located on one side (for example, an upper side) in the height direction Z, and another side (for example, a lower side) in the height direction Z of the bottom face 211a may be open. In this case, the pair of side walls 211b are provided on body sides in the width direction Y of the bottom face 211a.

An example where the main link arm 11 rotationally moves by using, as a rotational movement axis, the rotational movement shafts 121 and 131 at both ends in a single arm member has been described, but this is not restrictive. For example, a configuration where the main link arm 11 is divided in the extending direction X, and restrictive divided arms are connected by a link may be employed.

An example where the sub-link arm 21 rotationally moves by using, as a rotational movement axis, the rotational movement shafts 221 and 231 at both ends in a single arm member has been described, but this is not restrictive. For example, a configuration where the sub-link arm 21 is divided in the extending direction X, and restrictive divided arms are connected by a link may be employed. In this case, the restrictive divided arms may be provided with a groove, restrictive grooves may be continuous over the restrictive divided arms, and the routed line W may be routed in the grooves that are continuous over these respective divided arms.

An example where in the main link mechanism 10, the routed line W is not routed along the main link arm 11 has been described, but this is not restrictive. For example, in a case where the routed line W has been routed along the sub-link arm 21, the routed line may also be separately routed along the main link arm 11.

An example where the main link arm 11 is firmed in a pole shape has been described, but this is not restrictive. For example, the main link arm 11 may be formed in a shape including a groove, and the routed line W may be housed in the groove. Furthermore, the main link arm 11 may be formed in a tube shape, and the routed line W may be inserted into an inside, and may be routed.

An example where the sub-link arm 21 includes the groove 211c has been described, but this is not restrictive. The groove 211c may be omitted. In this case, the sub-link arm 21 is formed, for example, in a tube shape, a bar shape (a pole shape), or the like. In a case where the sub-link arm 21 is formed in the tube shape, the routed line W is inserted into an inside and is routed. In a case where the sub-link arm 21 is formed in the bar shape (the pole shape), the routed line W is routed to be aligned with the arm.

In the wiring harness routing structure, the link type sliding door, and the wiring harness according to the present invention, the routed line is routed through a lower side in the vertical direction of the vehicle-body-side coupler in a state where the door body has slid to be fully closed. Therefore, when an occupant opens the door body, and gets in or out, the routed line can be prevented from hindering getting-in or out, and as a result of this, the routed line can be properly routed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wiring harness routing structure comprising:
    a link arm extending in a horizontal direction and including one end that is rotatably coupled to a vehicle body by using a vehicle-body-side coupler, and another end that is rotatably coupled to a door body by using a door-side coupler, the link arm slidably supporting the door body relative to the vehicle body, while rotationally moving relative to each of the vehicle body and the door body; and
    a routed line that is routed and provided along the link arm, and connects a connection target on a side of the vehicle body and a connection target on a side of the door body, wherein
    the link arm comprises:
        a first cut-away portion on a lower side wall of the link arm extending in a horizontal direction and being a first opening of the lower side wall of the link arm; and
        a second cut-away portion on an upper side wall of the link arm extending in the horizontal direction and being a second opening of the upper side wall of the link arm, the routed line is routed from an outside on a lower side of the vehicle-body-side coupler to the link arm in a vertical direction through the first cut-away portion and from the link arm to the outside on an upper side of the door-side coupler in the vertical direction through the second cut-away portion, in a state where the door body has slid to be fully opened.

2. The wiring harness routing structure according to claim 1, wherein
the routed line is routed on the lower side of the vehicle-body-side coupler in the vertical direction, in a state where the door body has slid to be fully closed.

3. The wiring harness routing structure according to claim 1, wherein
the vehicle-body-side coupler is provided inside a doorway that is opened or closed by the door body, in a case where the vehicle-body-side coupler is viewed from a direction in which an occupant gets in or out in a state where the door body is fully opened.

4. The wiring harness routing structure according to claim 2, wherein
the vehicle-body-side coupler is provided inside a doorway that is opened or closed by the door body, in a case where the vehicle-body-side coupler is viewed from a direction in which an occupant gets in or out in a state where the door body is fully opened.

5. The wiring harness routing structure according to claim 1, wherein
the vehicle body includes a vehicle body frame that forms a framework of the vehicle body, and a projecting support that is provided to project from the vehicle body frame to a vehicle cabin side, and supports the vehicle-body-side coupler, and
the routed line is routed on the lower side of the projecting support in the vertical direction.

6. The wiring harness routing structure according to claim 2, wherein
the vehicle body includes a vehicle body frame that forms a framework of the vehicle body, and a projecting support that is provided to project from the vehicle body frame to a vehicle cabin side, and supports the vehicle-body-side coupler, and
the routed line is routed on the lower side of the projecting support in the vertical direction.

7. The wiring harness routing structure according to claim 3, wherein
the vehicle body includes a vehicle body frame that forms a framework of the vehicle body, and a projecting support that is provided to project from the vehicle body frame to a vehicle cabin side, and supports the vehicle-body-side coupler, and
the routed line is routed on the lower side of the projecting support in the vertical direction.

8. The wiring harness routing structure according to claim 1, wherein
the link arm includes a groove that is formed in a groove shape along an extending direction in which the link arm extends, the groove enabling the routed line to be housed, and
the routed line is routed in a state where the routed line is housed in the groove.

9. The wiring harness routing structure according to claim 2, wherein
the link arm includes a groove that is formed in a groove shape along an extending direction in which the link arm extends, the groove enabling the routed line to be housed, and
the routed line is routed in a state where the routed line is housed in the groove.

10. The wiring harness routing structure according to claim 3, wherein
the link arm includes a groove that is formed in a groove shape along an extending direction in which the link arm extends, the groove enabling the routed line to be housed, and
the routed line is routed in a state where the routed line is housed in the groove.

11. The wiring harness routing structure according to claim 5, wherein
the link arm includes a groove that is formed in a groove shape along an extending direction in which the link arm extends, the groove enabling the routed line to be housed, and
the routed line is routed in a state where the routed line is housed in the groove.

12. A link type sliding door comprising:
a door body that is mounted on a vehicle body;
a link arm extending in a horizontal direction and including one end that is rotatably coupled to the vehicle body by using a vehicle-body-side coupler, and another end that is rotatably coupled to the door body by using a door-side coupler, the link arm slidably supporting the door body relative to the vehicle body, while rotationally moving relative to each of the vehicle body and the door body; and
a routed line that is routed and provided along the link arm, and connects a connection target on a side of the vehicle body and the connection target on a side of the door body, wherein
the link arm comprises:
a first cut-away portion on a lower side wall of the link arm extending in a horizontal direction and being a first opening of the lower side wall of the link arm; and
a second cut-away portion on an upper side wall of the link arm extending in the horizontal direction and being a second opening of the upper side wall of the link arm,
the routed line is routed from an outside on a lower side of the vehicle-body-side coupler to the link arm in a vertical direction through the first cut-away portion and from the link arm to the outside on an upper side of the door-side coupler in the vertical direction through the second cut-away portion, in a state where the door body has slid to be fully opened.

13. A wiring harness comprising:
a routed line that is routed and provided along a link arm, and connects a connection target on a side of a vehicle body and the connection target on a side of a door body, the link arm including one end that is rotatably coupled to the vehicle body by using a vehicle-body-side coupler, another end that is rotatably coupled to the door body by using a door-side coupler, a first cut-away portion on a lower side wall of the link arm extending in a horizontal direction and being a first opening of the lower side wall of the link arm, and a second cut-away portion on an upper side wall of the link arm extending in the horizontal direction and being a second opening of the upper side wall of the link arm, and the link arm slidably supporting the door body relative to the vehicle body, while rotationally moving relative to each of the vehicle body and the door body, wherein
the routed line is routed from an outside on a lower side of the vehicle-body-side coupler to the link arm in a vertical direction through the first cut-away portion and from the link arm to the outside on an upper side of the door-side coupler in the vertical direction through the second cut-away portion, in a state where the door body has slid to be fully opened.

* * * * *